(12) United States Patent
Liao et al.

(10) Patent No.: US 8,254,113 B2
(45) Date of Patent: Aug. 28, 2012

(54) CIRCUIT BOARD ASSEMBLY

(75) Inventors: Tsung-Kuel Liao, Tu-Cheng (TW);
Te-Chung Kuan, Tu-Cheng (TW);
Chan-Kuei Hsu, Tu-Cheng (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 184 days.

(21) Appl. No.: 12/900,656

(22) Filed: Oct. 8, 2010

(65) Prior Publication Data
US 2011/0255240 A1 Oct. 20, 2011

(30) Foreign Application Priority Data
Apr. 20, 2010 (TW) .............................. 99112412 A

(51) Int. Cl.
*H05K 7/20* (2006.01)

(52) U.S. Cl. .................... 361/679.54; 361/704; 361/707; 361/719; 165/80.3; 165/185; 257/717; 257/719; 174/16.3

(58) Field of Classification Search ....... 361/679.46–54, 361/704–712, 715, 719–724; 165/80.2–80.5, 165/104.33, 104.34, 185; 257/706–727; 174/15.1, 15.2, 16.3; 411/516, 511, 522, 411/523, 520; 248/505, 510, 316.7; 24/457, 24/458, 295, 296
See application file for complete search history.

(56) References Cited

U.S. PATENT DOCUMENTS

| | | | | |
|---|---|---|---|---|
| 7,136,167 B2* | 11/2006 | Failes | ............................. | 356/479 |
| 7,193,853 B2* | 3/2007 | Chen et al. | ..................... | 361/719 |
| 7,327,575 B2* | 2/2008 | Yu et al. | ......................... | 361/719 |
| 7,371,100 B1* | 5/2008 | Polnyi | ............................. | 439/331 |
| 2006/0007652 A1* | 1/2006 | Yatskov et al. | ................ | 361/687 |
| 2008/0030959 A1* | 2/2008 | Li | .................................. | 361/704 |
| 2008/0055847 A1* | 3/2008 | Belady et al. | .................. | 361/687 |

* cited by examiner

*Primary Examiner* — Michail V Datskovskiy
(74) *Attorney, Agent, or Firm* — Altis Law Group, Inc.

(57) ABSTRACT

A circuit board assembly includes a motherboard defining a number of plug slots, and a fixing mechanism for securing a heat sink. The fixing mechanism is positioned between two adjacent plug slots, and includes a support member mounted on the motherboard, two fixing brackets mounted on opposite ends of the support member, two bars rotatably connected to the fixing brackets, and a connection member detachably connected to the support member by the bars. The opposite borders of the support member extend in the same direction substantially parallel to the plug slots, and the support member forms four connecting portions for securing the heat sink on opposite sides thereof, and the connecting portions are located between the opposite borders.

16 Claims, 4 Drawing Sheets

CIRCUIT BOARD ASSEMBLY

BACKGROUND

1. Technical Field

The present disclosure generally relates to circuit board assemblies, and particularly, to a circuit board assembly used with a motherboard system.

2. Description of Related Art

A motherboard system of a computer is becoming increasingly integrated to support a growing number of features and/or more compact packaging. Typically, the motherboard system includes a motherboard, a microprocessor, a co-processor (if any), a memory, a basic input/output system, a number of plug slots, and one or more heat sinks mounted on the microprocessor. In a commonly used motherboard system, the plug slots are substantially parallel to a fixing bracket for securing the heat sink. Generally, the fixing bracket is substantially rectangular with four connecting portions protruding from the four corners thereof and extending along the diagonal of the fixing bracket. Because the connecting portions extend outward, the fixing bracket occupies a relatively large area, and the distance between the plug slot and the fixing bracket is relatively small. However, the width of the motherboard is limited, thereby is not convenient for the assembly and removal of the fixing bracket.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
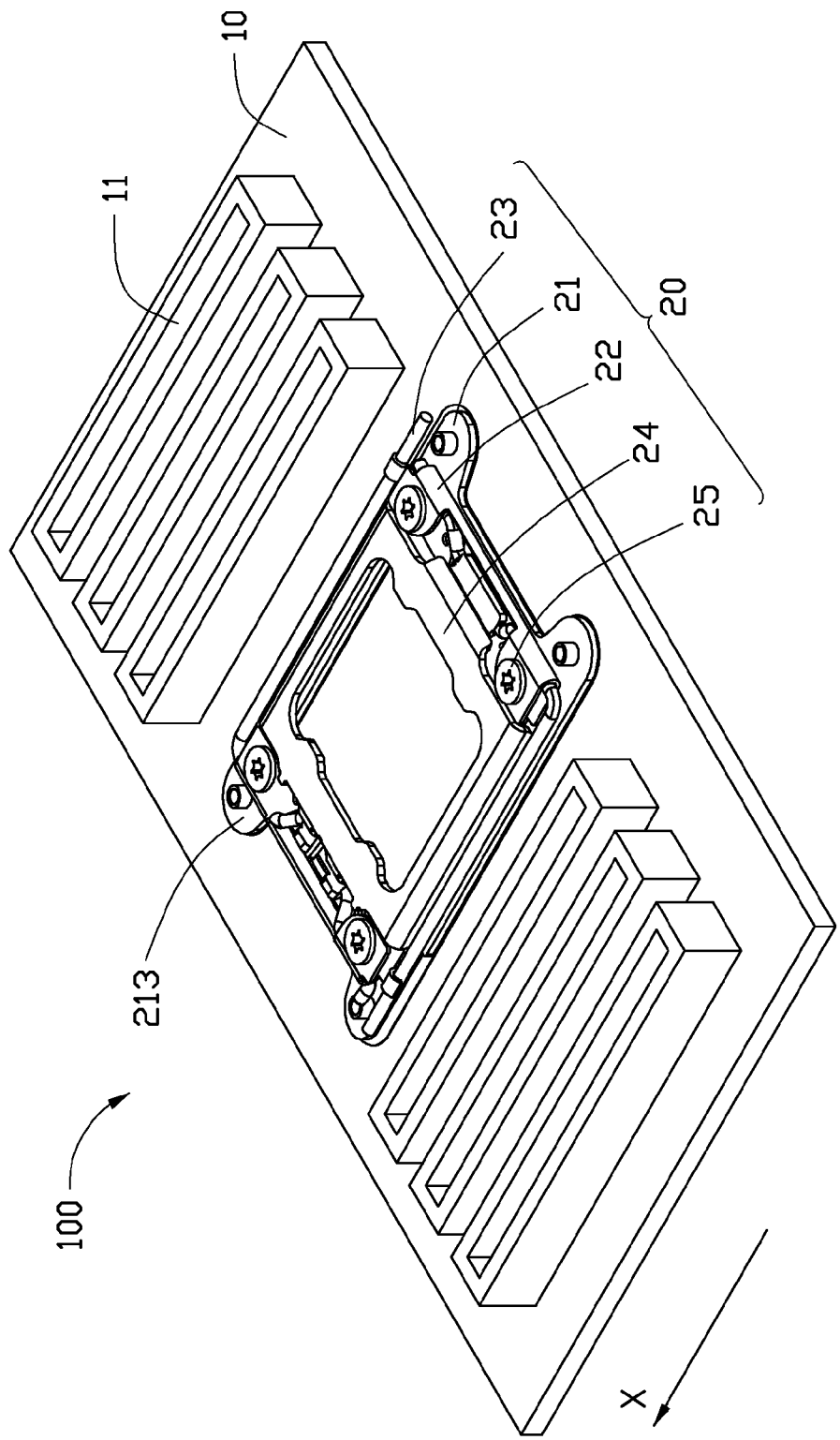
FIG. 1 is an isometric view of one embodiment of a circuit board assembly, and the circuit board assembly including a fixing mechanism.

Referring to FIG. 1, one embodiment of a circuit board assembly 100 according to the disclosure includes a motherboard 10 and a fixing mechanism 20 for securing a heat sink. The motherboard 10 defines a number of plug slots 11 for plugging in a plurality of memory banks. The plug slots 11 are substantially parallel to each other, and extend along the same direction X, which is substantially parallel to the plug slots 11. The fixing mechanism 20 is mounted on the motherboard 10, and is positioned between two adjacent plug slots 11.

Figure 2:
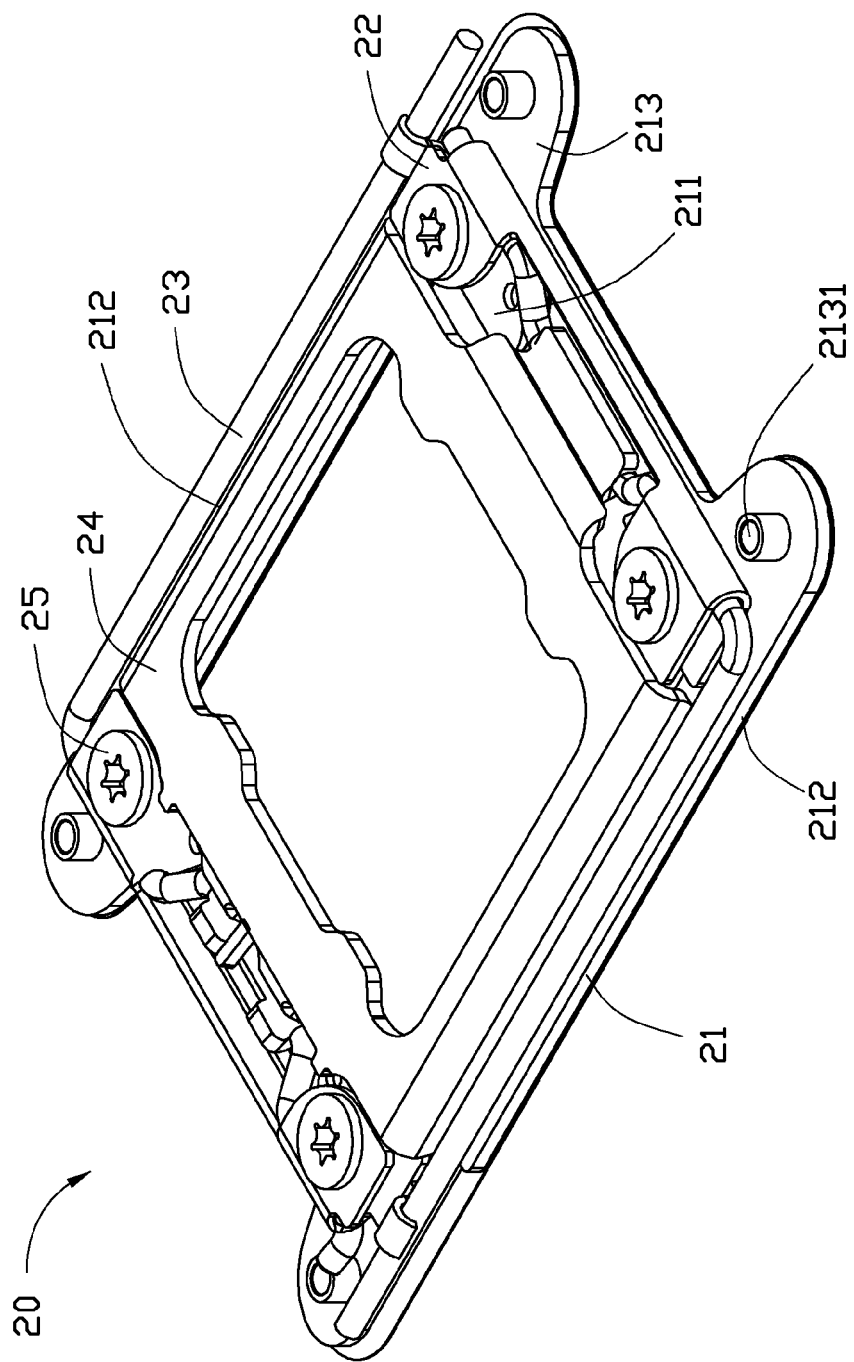
FIG. 2 is an isometric view of the fixing mechanism of the circuit board assembly of FIG. 1.

As shown in FIGS. 1 and 2, the fixing mechanism 20 includes a support member 21, which is a substantially rectangular frame. Two fixing brackets 22 are respectively positioned on opposite ends of the support member 21. Two bars 23 are positioned around the support member 21; a connection member 24 is detachably connected to the support member 21 by the bars 23; and a number of fasteners 25 fix the fixing brackets 22 to the support member 21.

The support member 21 includes a main body 211 and four connecting portions 213 outwardly extending from four corners of the main body 211, respectively. The main body 211 is substantially rectangular and defines four connecting holes 2111 for receiving the corresponding fasteners 25. Opposite borders 212 of the main body 211 extend in the same direction X and cooperatively define the total width of the fixing mechanism 20. The connecting portions 213 are positioned between the opposite borders 212. In other words, the connecting portions 213 are located between the opposite borders 212, without having any extension. Each connecting portion 213 has a protruding connection post 2131 for the mounting of the heat sink.

Each fixing bracket 22 includes a bottom surface 221 and two side surfaces 223 perpendicularly extending from opposite sides of the bottom surface 221. Each side surface 223 defines a cutout 225 in the middle portion of the side surface 223, and two fixing holes 227 on opposite ends, respectively. One of the side surfaces 223 forms a hook 229 on an end thereof for catching one bar 23.

Each bar 23 includes a first segment 231 and a second segment 233 substantially perpendicular to the first segment 231. The first segment 231 has a middle portion 2313 protruding inwards into the connection member 24, two rotation portions 2311 connected to opposite ends of the middle portion 2313, and a stop portion 2315 extending from a distal end of one rotation portion 2311 to contact the fixing bracket 22. The second segment 233 extends straight.

The connection member 24 is a substantially rectangular frame and includes two first receiving portions 241 formed on one side of the connection member 24, and the first receiving portions 241 are spaced from each other. A limiting portion 243 is positioned between the two first receiving portions 241, and a second receiving portion 245 is formed on the other side of the connection member 24.

During assembly of the fixing mechanism 20, the rotation portions 2311 are rotatably received between the corresponding side surfaces 223 with the middle portion 2313 positioned on the cutout 225. The fasteners 25 pass through the fixing holes 227 in the side surface 223, and the connecting hole 2111 in the support member 21 to fix the bar 23 to the fixing bracket 22, so that each bar 23 can rotate about the axis of the rotation portion 2311. The stop portion 2315 of the first segment 231 contacts the bottom surface 221 of the fixing bracket 22 to prevent the bar 23 from sliding relative to the fixing bracket 22. The second segment 233 of the bar 23 rotatably connects one fixing bracket 22 that can be caught by the hook 229 formed on the other fixing bracket 22.

Figure 3:
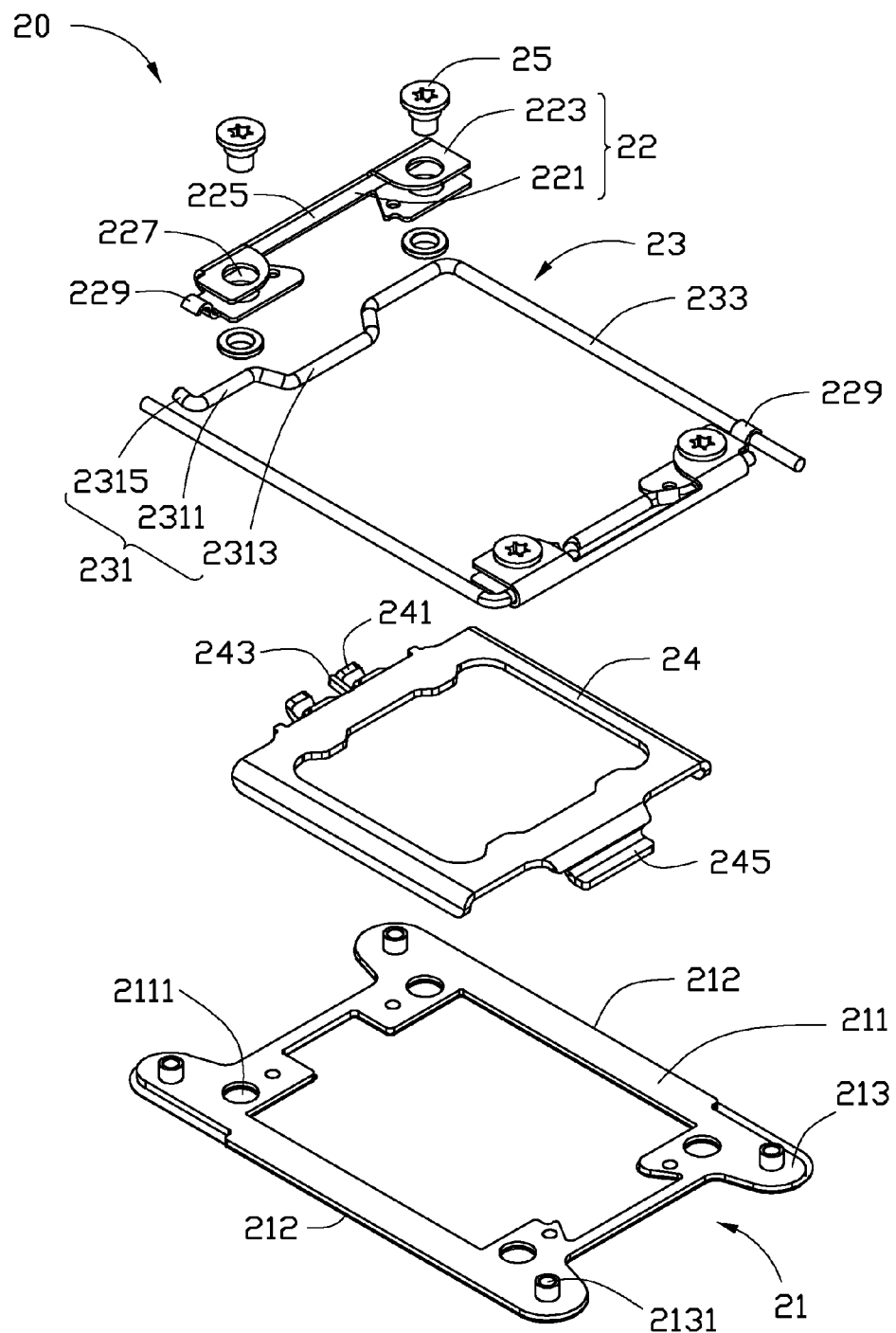
FIG. 3 is an exploded, isometric view of the fixing mechanism of FIG. 2.
Figure 4:
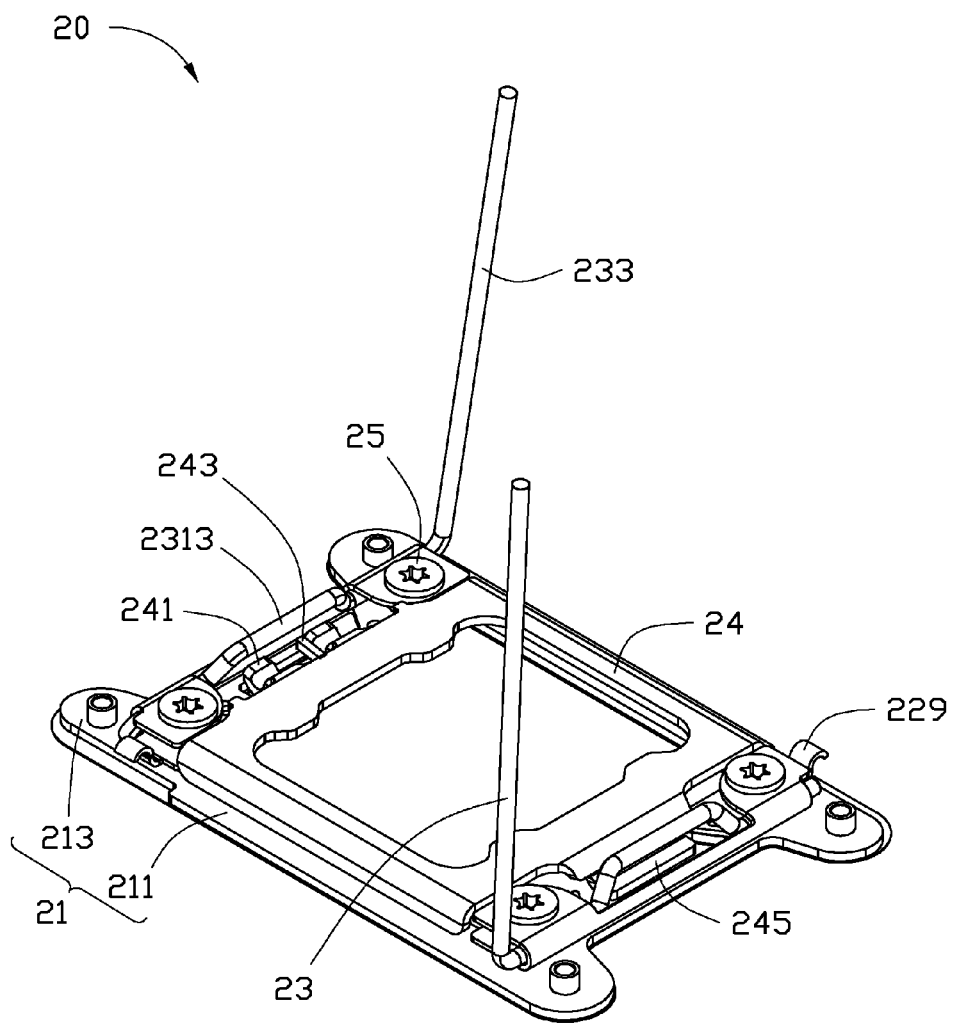
FIG. 4 is similar to FIG. 3, but viewed from another aspect.

Referring to FIGS. 3 and 4, in use, when the bar 23 is removed or detached from the fixing bracket 22, the bar 23 can be rotated relative to the fixing bracket 22 about the axis of the rotation portion 2311, such that the connection member 24 is released. When force is exerted on the second segment 233, the bar 23 rotates, and the second segment 233 is moved downwards. When the second segment 233 and the fixing bracket 22 are substantially on the same plane, the middle portion 2313 of one bar 23 is received in the first receiving portion 241 and restricted by the limiting portion 243, and the middle portion 2313 of the other bar 23 is received in the second receiving portion 245. The bars 23 are fixed to the fixing bracket 22 by latching the second segment 233 into the hook 229, thus securing the connection member 24 to the support member 21.

Referring to FIGS. 1 to 3 again, the opposite borders 212 of the support member 21, extending in the same direction X, cooperatively define the total width of the fixing mechanism 20 and the connecting portions 213 are located between the opposite borders 212. A relatively large distance exists between the fixing mechanism 20 and the plug slots 11, thus facilitating the assembly and removal of the fixing mechanism 20. In addition, a relatively large gap is formed between the fixing mechanism 20 and the plug slots 11, thus facilitating heat dissipation.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A circuit board assembly comprising:
a motherboard defining a plurality of plug slots; and
a fixing mechanism for securing a heat sink, the fixing mechanism being positioned between two adjacent plug slots and comprising:
   a support member mounted on the motherboard;
   two fixing brackets mounted on opposite ends of the support member;
   two bars rotatably connected to the fixing brackets, respectively; and
   a connection member detachably connected to the support member by the bars;
wherein opposite borders of the support member extend in the same direction parallel to the plug slots, and the support member forms four connecting portions for securing the heat sink on opposite sides thereof, and the connecting portions are located between the opposite borders.

2. The circuit board assembly of claim 1, wherein each bar comprises a first segment rotatably connected to the fixing bracket, and a second segment, substantially perpendicular to the first segment, for securing the connection member to the support member.

3. The circuit board assembly of claim 2, wherein the first segment comprises a middle portion protruding inwards, two rotation portions connected to opposite ends of the middle portion, and a stop portion extending from a distal end of one rotation portion to contact the fixing bracket.

4. The circuit board assembly of claim 2, wherein the second segment extends straight.

5. The circuit board assembly of claim 3, wherein each fixing bracket comprises a bottom surface and two side surfaces perpendicularly extending from opposite sides of the bottom surface, and the first segment is located between the side surfaces.

6. The circuit board assembly of claim 5, wherein each side surface defines a cutout in the middle portion thereof to receive the middle portion of the first segment.

7. The circuit board assembly of claim 6, wherein one of the side surfaces forms a hook on an end thereof for catching a bar.

8. The circuit board assembly of claim 6, wherein the connection member comprises two first receiving portions formed on one side of the connection member, and the first receiving portions are spaced from each other to catch one bar, a limiting portion positioned between the two first receiving portions, and a second receiving portion formed on the other side of the connection member to catch the other bar.

9. The circuit board assembly of claim 1, wherein each connecting portion forms a connection post for the mounting of the heat sink.

10. A circuit board assembly comprising:
a motherboard defining a plurality of plug slots; and
a fixing mechanism for securing a heat sink, the fixing mechanism being positioned between two adjacent plug slots and comprising:
   a support member mounted on the motherboard;
   two fixing brackets mounted on opposite ends of the support member, respectively, and each fixing bracket comprising a hook;
   two bars rotatable relative to the fixing brackets and capable of being received in and being released from the corresponding hooks;
   a connection member detachably connected to the support member via the engagement of the bars and the corresponding hooks;
wherein opposite borders of the support member extend in the same direction parallel to the plug slots, and the support member forms four connecting portions for securing the heat sink on opposite sides thereof, and the connecting portions are located between the opposite borders, thereby the total width of the fixing mechanism is defined by the opposite borders.

11. The circuit board assembly of claim 10, wherein each bar comprises a first segment rotatably connected to the fixing bracket, and a second segment substantially perpendicular to the first segment for securing the connection member to the support member.

12. The circuit board assembly of claim 11, wherein the first segment comprises a middle portion protruding inwards, two rotation portions positioned on opposite ends of the middle portion, and a stop portion extending from a distal end of one rotation portion to contact the fixing bracket.

13. The circuit board assembly of claim 11, wherein the second segment extends straight.

14. The circuit board assembly of claim 12, wherein each fixing bracket comprises a bottom surface and two side surfaces perpendicularly extending from opposite sides of the bottom surface, and the first segment is located between the side surfaces.

15. The circuit board assembly of claim 14, wherein each side surface defines a cutout in the middle portion thereof to receive the middle portion of the first segment.

16. The circuit board assembly of claim 10, wherein the connection member comprises two first receiving portions formed on one side of the connection member, and the first receiving portions are spaced from each other to catch a bar, a limiting portion positioned between the two first receiving portions, and a second receiving portion formed on the other side of the connection member to catch the other bar.

\* \* \* \* \*